July 13, 1926.
L. W. BUGBEE
1,592,076
MEANS FOR SHAPING GRINDERS FOR BIFOCAL LENSES
Filed Oct. 6. 1924
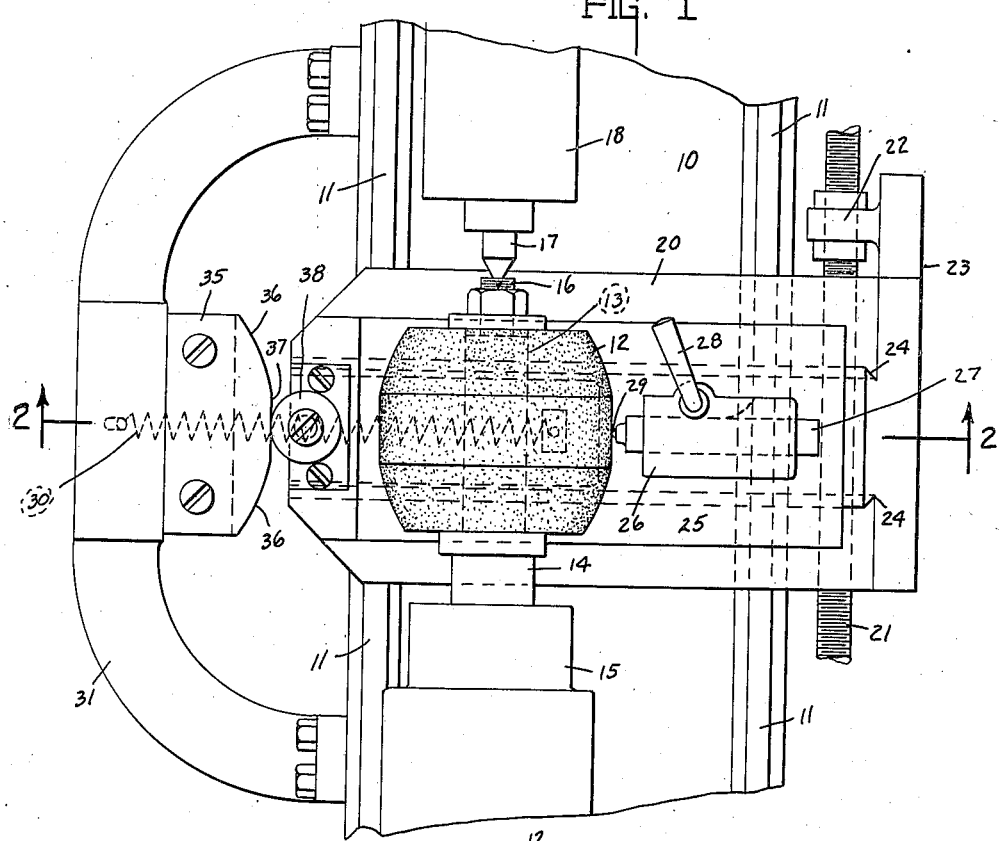
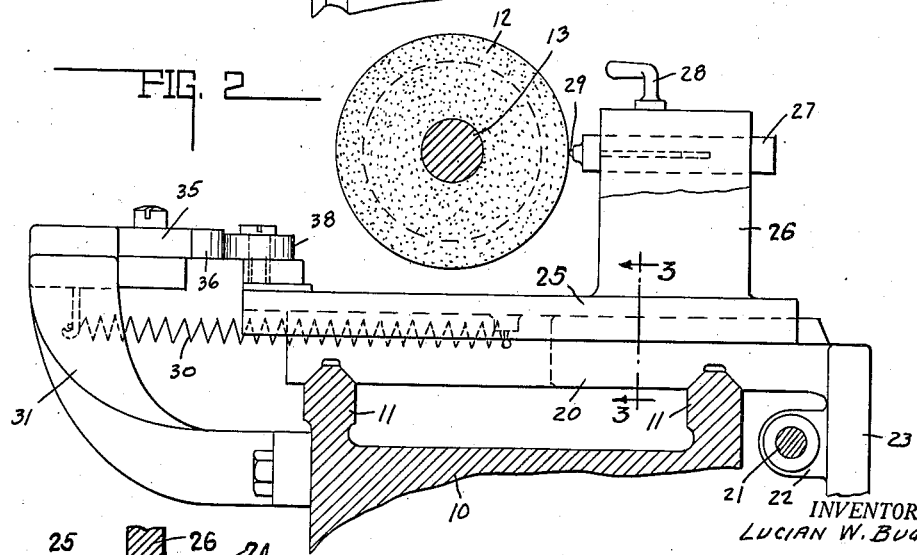
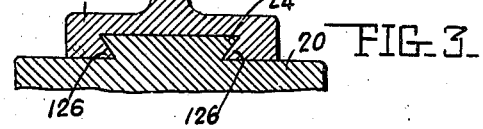
INVENTOR.
LUCIAN W. BUGBEE.
BY
Lockwood & Lockwood
ATTORNEYS.

Patented July 13, 1926.

1,592,076

UNITED STATES PATENT OFFICE.

LUCIAN W. BUGBEE, OF INDIANAPOLIS, INDIANA, ASSIGNOR, BY MESNE ASSIGNMENTS, TO CONTINENTAL OPTICAL CORPORATION, OF NEW YORK, N. Y., A CORPORATION OF DELAWARE.

MEANS FOR SHAPING GRINDERS FOR BIFOCAL LENSES.

Application filed October 6, 1924. Serial No. 742,001.

This invention relates to means for shaping the peripheral grinding surface of a grinding wheel made of alundum and the like, substantially as shown in my former application for Letters Patent, Serial No. 689,237, filed January 29, 1924.

It is very important that said grinding surface be very accurately and clearly shaped and trued because it has a plurality of grinding zones on it with intermediate dividing lines for grinding the different fields of the bifocal lens so that they will merge smoothly and make a perfect dividing line substantially free from prismatic effects. In actual practice these grinders must be trued once every day, for, as a rule, they will not maintain grinding surfaces for more than one day's use, which are sufficiently true for making the present high character of one-piece bifocal lenses.

The chief feature of the invention consists in means for the accurate mounting of a rotary grinder over two carriages, one movable parallel with the axis of the grinder and the other carriage movable thereon at a right angle to the axis of the grinder. Said first-mentioned carriage has means for slowly giving it feeding movement and said second-mentioned carriage carries a diamond cutter, and this carriage is yieldingly fed to bring the cutter in engagement with the grinder. A stationary template with multifocal transverse curvatures corresponding with a transverse line across the annular zones desired to be generated on a grinder, and a roller on the carriage travelling transversely of said template and bearing against the same as the carriage and its supporting guiding means are fed laterally.

The full nature of the invention will be understood from the accompanying drawings and the following description and claims:

In the drawings, Figure 1 is a plan view of the mechanism in position for operation, parts being shown in dotted lines and parts being broken away. Fig. 2 is a central vertical section on the line 2—2 of Fig. 1. Fig. 3 is a vertical section on the line 3—3 of Fig. 2, parts being broken away.

The general machine frame in which this mechanism is mounted is not here shown, but it has a table 10 with a pair of parallel guide rails 11, which are parallel with the axis of the grinder 12 that is made of alundum or like material. The arbor 13 of said wheel is carried by a holder 14 mounted in a stationary bearing 15. The holder 14 is rotated by means not here shown. At the other end of the arbor 13 there is an adjustable threaded bearing piece 16 recessed in the end to fit on a center 17 that is secured to a stationary structure 18. The particular means for mounting the grinder 12 is rather immaterial so long as it is easy to grind and remove said grinder and its axis is parallel with the guide rails 11.

Under the grinding wheel 12 there is a carriage 20 mounted on said track rails 11 and movable along the same by a screw feed rod 21 mounted on means and driven by means not here shown. It extends through an ear 22 from a flange 23 that projects downwardly from the rear end of said carriage as seen in Fig. 2. The carriage 20 has dovetailed guide 24, as seen in Fig. 1, which extends longitudinally of the carriage 20 and at a right angle to the axis of the grinder.

The upper carriage 25 is mounted on the lower carriage 20 so as to travel at a right angle to the direction of travel of said lower carriage. It, therefore, has ribs 126 on its under side forming a dovetail recess to receive the guide 24 on the lower carriage. Said upper carriage 25 carries a post 26 in which a cutter bar 27 is clamped by a clamp 28 and said cutter bar has a diamond point 29. The diamond cutter is mounted so as to engage the periphery of the grinder in a plane preferably that extends horizontally through the axis of the grinder, as seen in Fig. 2. The feeding movement of the cutter holding carriage 25 is effected by a spring 30 connected at one end to said carriage and the other end to the stationary frame member 31. The direction of pull of this spring is transversely of the axis of the grinder, and it, therefore, yieldingly holds the cutter against the periphery of the grinder and as the lower table 20 is moved in a direction parallel with the axis of the grinder, it will enable said cutter to cut the entire periphery of the grinder.

In order to shape the surface of the grinder and especially the transverse curvatures, a template 35 is secured to the frame member 11 and it has an edge projecting towards the cutter carriage 25 and said edge has three curved sections, the two end sections 36 and the intermediate section 37 having different curvatures. This edge of the template 30 is engaged by a roller 38 mounted on the adjacent end of the carriage 25 on which the cutter is mounted.

In operation the grinding wheel 12 is mounted in the machine and rotated constantly. The compound carriage mechanism which carries the cutter is fed in a direction parallel with the grinding wheel, by the feed rod 21. At the same time the spring 30 yieldingly holds the cutter carriage 25 at its left-hand limit of movement, that is, as far as the roller 38 and the template 35 will permit. Hence, in the operation, the roller 38 travels longitudinally of the template 35, from one end to the other, and thus predetermines the peripheral shape of the grinder. With an accurate bifocal edged template 35 rigidly mounted and with a cutter rigidly mounted on the carriage 25, and with the carriages mounted for relatively long distance in guiding means, and with a relatively fixed means for the accurate mounting of the grinder, this construction is enabled to shape bifocal lens grinding wheels accurately enough to make the high class of one piece bifocal lenses now required by the public.

The invention claimed is:

1. Apparatus for shaping wheels for grinding lenses, consisting of a frame with a base having parallel guide rails, means on said frame for mounting and rotating the grinding wheel above and with its axis parallel to said guide rails, a carriage mounted on said guide rails under the grinding wheel, a rotary feed screw beside and parallel with said guide rails, means extending from said carriage for engaging said feed screw so that it will move said carriage on said guide rails, a second carriage mounted on said first carriage so as to be slidable transversely thereof and of said guide rails, a post extending up from said second carriage at one side of the grinding wheel, a cutter mounted in said post for engaging the grinding wheel, an arm extending from said frame and curved upward on the side of the grinding wheel opposite said cutter, a horizontal template on the upper end of said arm with its forming edge toward the grinding wheel, means mounted on the end of said second carriage on the side opposite the grinding wheel from the said post in position to engage the forming edge on the template, and a spring secured at one end to the said second carriage and at the other end to the upper part of said template supporting arm tending to hold the second carriage against the template, substantially as set forth.

2. Apparatus for shaping wheels for grinding lenses as set forth in claim 1, with the means on the end of the second carriage engaging the template including a roller, and the forming edge of the template having two concentric end portions and a central portion with less curvature than said end portions, substantially as set forth.

In witness whereof, I have hereunto affixed my signature.

LUCIAN W. BUGBEE.